United States Patent [19]

Jarema

[11] Patent Number: 5,298,184
[45] Date of Patent: Mar. 29, 1994

[54] PAINT STRIPPER COMPOSITION

[75] Inventor: Chester P. Jarema, Sterling Heights, Mich.

[73] Assignee: Specialty Environmental Technologies, Inc., Auburn Hills, Mich.

[21] Appl. No.: 911,188

[22] Filed: Jul. 9, 1992

[51] Int. Cl.$^5$ .................. C11D 7/22; C11D 7/26; C11D 7/32

[52] U.S. Cl. .................. 252/171; 252/162; 252/170; 252/DIG. 8

[58] Field of Search ......... 252/162, 170, 171, DIG. 8; 134/39, 40

[56] References Cited

U.S. PATENT DOCUMENTS

| | | | |
|---|---|---|---|
| 4,120,810 | 10/1978 | Palmer | 252/153 |
| 4,428,871 | 1/1984 | Ward et al. | 252/542 |
| 4,533,487 | 8/1985 | Jones | 252/170 |
| 4,620,937 | 11/1986 | Dellutri | 252/143 |
| 4,666,626 | 5/1987 | Francisco | 252/153 |
| 4,749,510 | 6/1988 | Nelson | 252/166 |
| 4,764,222 | 8/1988 | Colegrove | 134/38 |
| 4,865,758 | 9/1989 | Caster et al. | 252/171 |
| 5,006,279 | 4/1991 | Grobbel et al. | 252/542 |
| 5,011,621 | 4/1991 | Sullivan | 252/162 |
| 5,035,829 | 7/1991 | Suwala | 252/170 |
| 5,049,300 | 9/1991 | Fusiak et al. | 252/162 |
| 5,098,591 | 3/1992 | Stevens | 252/162 |
| 5,098,592 | 3/1992 | Narayanan et al. | 252/162 |
| 5,112,516 | 5/1992 | Koetzle | 252/162 |
| 5,124,062 | 6/1992 | Stevens | 252/162 |
| 5,154,848 | 10/1992 | Narayaran et al. | 252/162 |
| 5,167,853 | 12/1992 | Stevens | 252/162 |

OTHER PUBLICATIONS

"The Safety, Toxicology, And Biodegradation of d-Limonene", Florida Chemical Company, Inc., (Revised Jan. 30, 1989).
"D-Limonene", Florida Chemical Company, Inc., (Jun. 24, 1991).
"Technical Information (Electronic), NMP N-Methylpyrrolidone The Safer Solvent", BASF, (1989).
"Material Safety Data Sheet, N-Methyl-Pyrrolidone", Amcor Industries, Inc., (Mar. 19, 1992).

*Primary Examiner*—Paul Lieberman
*Assistant Examiner*—Michael P. Tierney
*Attorney, Agent, or Firm*—Harness, Dickey & Pierce

[57] ABSTRACT

Compositions according to the present invention include as essential components: from about 10% to about 50% by weight of d-limonene, from about 50% to about 90% by weight of NMP, and from about 0% to about 10% by weight of a thickener.

4 Claims, No Drawings

PAINT STRIPPER COMPOSITION

BACKGROUND OF THE INVENTION

1. Field of the Invention

The present invention relates to a paint stripper composition for the removal of cured or partially cured paint materials from substrates. More specifically, the invention relates to an improved paint stripper containing a combination of N-methyl-2-pyrrolidone (NMP) and dlimonene for effective paint removal and a more pleasing aroma.

2. Description of Relevant Art

The term "paint" as hereafter used refers to coatings such as epoxies, enamels, latexes, primers, basecoats, clearcoats, lacquers, varnishes, shellacs and polyurethane finishes used to protect and/or beautify substrates. As used herein, the term "paint stripper" refers to compositions which remove or facilitate the removal of paint from a substrate.

Chemical based paint strippers have enjoyed widespread commercial application due to their relative ease of use over various physical scraping and/or sanding methods of paint removal. Many of these paint strippers are solvent based, utilizing methylene chloride, methanol, or butanol, among others, as solvent components. While these solvents yield significant paint removal, they also present potential health, safety, and environmental concerns to both the user and the surrounding environment.

U.S. Pat. No. 2,507,983 discloses a paint stripper which contains methylene chloride and methylcellulose, a thickening agent used to increase the viscosity of the formulation. Methylene chloride is an effective low-cost paint stripper characterized by high vapor pressure (400 mm Hg at 75° F.) which causes it to evaporate very rapidly. This high vapor pressure leads to an extreme vapor inhalation hazard. In addition, methylene chloride is a suspected carcinogen as well as a dermal irritant. A further concern of methylene chloride deals with possible ground water contamination when the residual stripper is removed from the substrate.

In an effort to reduce the health, safety, and toxicity dangers of methylene chloride based paint strippers, several formulations utilizing N-methyl-2-pyrrolidone (NMP) have been developed. NMP has been proposed as a substitute for chlorinated solvents because of its effectiveness, low toxicity, biodegradability and high flash point. Frusiak, in U.S. Pat. No. 5,049,300, discloses paint stripping compositions which include formic acid, NMP and ethyl-3-ethoxypropionate (EEP). This formulation acidifies the NMP with an organic or inorganic acid with a pH of 4.0 or less, preferring the use of formic, sulfuric, or phosphoric acid. U.S. Pat. No. 4,812,255 and U.S. Pat. No. 4,749,510 also use formic acid as a component of the overall composition. However, each of the above formulations still presents a dermal safety hazard due to the low pH of the formic acid (pH=2.3) and other components.

U.S. Pat. No. 5,006,279 discloses a paint stripper composition which includes NMP and at least one mononuclear aromatic hydrocarbon. Similarly, U.S. Pat. Nos. 4,120,810; 4,749,510; and 4,666,626 contain aromatic hydrocarbons within the formulation.

These and other formulations, however, may still present potential health, safety, and dermal hazards based on the absorption rate of the particular aromatic hydrocarbon or aromatic solvent used. In addition, many aromatic hydrocarbons are believed to be carcinogenic, pose environmental concerns, and are troublesome regarding disposal of spent chemical.

Sullivan, U.S. Pat. No. 5,011,621 relates to mixtures of NMP, selected co-solvents (which may include aromatic hydrocarbons and terpenes such as d-limonene), as well as animal and/or vegetable oil as a means to effectively remove paint from substrates. However, the presence of one or more of these natural components such as tallows and fatty acids may lead to the growth of microbiological organisms within the formulation, thereby decreasing the "shelf-life" of the product. The presence of microbiological organisms could lead to altered product performance as well as a noxious and rancid odor, especially when the product is exposed to sunlight.

Thus, there remains a need in the art to provide an effective stripper which has a less than offensive odor, a long shelf life and is effective for stripping of most paints.

Accordingly, it is an object of this invention to provide effective paint strippers with improved health, safety and environmental characteristics.

A particular object of the invention is to provide an improved paint stripper with lower toxicity, volatility, and irritability which is both methylene chloride and aromatic hydrocarbon free. Another object of the invention is to provide an acceptable fragrance or aroma to the paint stripper which would improve the consumer acceptance.

Still, another object of the invention is to provide an improved paint stripper with increased product longevity or shelf-life, which is immune from possible microbiological growth.

SUMMARY OF THE INVENTION

The above objects are achieved and the shortcomings in the prior art are overcome by the present invention, a non-toxic paint stripper with an acceptable aroma which is methylene chloride and aromatic hydrocarbon free, thereby reducing exposure to suspected carcinogens.

Compositions according to the present invention include as essential components: from about 10% to about 55% by weight of d-limonene, from about 45% to about 90% by weight of N-methyl-2-pyrrolidone (NMP), and from about 0% to about 10% by weight of a thickener.

Within the ranges defined above, NMP and d-limonene exert an improved paint removal effect not suggested in the art. The incorporation of naturally derived d-limonene further provides a more palatable and acceptable citric fragrance than prior art paint stripper compositions.

Further objects, benefits and advantages of the present invention will be realized upon review of the description of the preferred embodiments, and the examples and claims appended hereto wherein all percentages are percentages by weight unless otherwise specified.

DESCRIPTION OF THE PREFERRED EMBODIMENTS

In accordance with the present invention there is provided a paint stripping composition which is simple in nature including two effective ingredients which when formulated together provide unexpectedly advantageous results. The two critical ingredients of the present invention are NMP and d-limonene. In a preferred embodiment these components are used with a thickener to allow the stripper to maintain contact with surfaces which may be at an angle other than horizontal. Generally, compositions of the present invention include from about 10% to about 55% by weight of d-limonene, from about 45% to about 90% by weight of NMP and from about 0 to about 10% by weight of a thickener. Typically, compositions of the present invention include from about 20% to about 40% d-limonene, from about 60% to about 80% NMP, and from about 1% to about 5% thickener. In preferred embodiments of the present invention the compositions include from about 28% to about 34% d-limonene, from about 65% to about 70% NMP and from about 1% to about 2% thickener.

The NMP constituent of the present invention is of course a main paint stripping component of the stripper compositions of the present invention. However, it has been found in the present invention that the combination of NMP and d-limonene in the paint stripper composition provides advantageous results above and beyond those expected or suggested by the art. N-methyl 2 pyrrolidone is a commercially available low toxicity component. This component may be selected from any of the commercially available forms suitable for use in the present invention. However, NMP is somewhat expensive. Therefore, the use of d-limonene in the amounts set forth above reduces the overall cost of the stripper compositions of the present invention and provides improved results over the use of NMP alone.

In the present invention a naturally derived d-limonene is utilized as a major constituent. The use of such quantities of d-limonene reduces the amount of NMP in the composition which as stated above is an expensive component. Unexpectantly, even though less NMP is utilized a synergistic result is obtained with these higher levels of d-linonene in that an improved stripper composition is obtained which has better stripping properties than strippers containing significantly higher levels of NMP. Additionally, d-limonene also has a pleasant orange citrus aroma which is critical in the present invention. This citrus aroma is provided by use of naturally formulated d-limonene which must be extracted from orange peels to be useful in the present invention as the odorant. Thus, a synthetically produced d-limonene would not be preferable in that synthetically produced d-limonene does not include the enhanced odorant of orange peels of naturally occurring d-limonene. However, synthetically produced d-limonene would provide the advantageous paint stripping results of the present invention, and therefore may be substituted if a citrus odor is not desirable or necessary.

As set forth above, in a preferred embodiment, thickeners are utilized in the present invention to produce a readily usable paint stripper composition. Thickeners useful in the present invention include preferably the cellulosic thickeners known to those skilled in the art. However, other thickeners such as clays, starches, gums, and swellable polymers can be useful in the present invention.

Paint strippers of the present invention have been found to remove paint such as epoxy enamels, soya alkyds, oil modified polyesters, vinyl acrylic latex and varnishes.

The paint strippers of the present invention are designed for use as consumer products and therefore must be of low toxicity, have good shelf life properties and be effective on a wide variety of paints. Thus, constituents such as tallows, fatty acid containing substances or the like, which can become rancid are undesirable in the present invention since such would substantially reduce the shelf life.

Other additions which can be included without deviating from the scope of the present invention include surfactants, stripping accelerators and the like, or other readily advantageous components known for use in paint strippers provided they do not disadvantageously detract from the odor or shelf life properties of the present invention. The composition of the present invention typically have shelf lives ranging from two years to indefinitely depending on the characteristics of the storage. Typically, such compositions, since they are in the consumer market, must have a retail shelf life of six months to one year.

Further understanding of the present invention will be had in reference to the following examples set forth herein for purposes of illustration of the present invention rather than limitation thereof.

EXAMPLE I

Formulations of the present invention are prepared in accordance with Table 1 below.

TABLE I

| Composition | A | B | C | D | E | F*** | G*** | H*** | I*** | J*** | K*** |
|---|---|---|---|---|---|---|---|---|---|---|---|
| NMP | 49% | 59% | 69% | 79% | 89% | 69% | 69% | 69% | 69% | 69% | 69% |
| d-limonene | 50% | 40% | 30% | 20% | 10% | 30% | 30% | 30% | 30% | 30% | 30% |
| Methocel 311 Thickener* | 1% | 1% | 1% | 1% | 1% | 1% | 1% | 1% | 1% | 1% | 1% |
| Triton N-101** | — | — | — | — | — | 1% | 2% | 5% | — | — | — |
| Mono-Ethanol-Amine (MEA) | — | — | — | — | — | — | — | — | 1% | 2% | 5% |

*Dow Chemical
**Union Carbide
***These formulations included the specified percentage of Triton or MEA with the remainder being a preferred formulation of 69% NMP, 30% d-limonene and 1% Methocel Thickener.

For comparison purposes, Formulations in accordance with those of U.S. Pat. No. 5,011,621 are prepared in accordance with Table II below.

TABLE II

| Composition | 2 | 4 | 6 | 7 | 10 | 11 | 13 | 15 |
|---|---|---|---|---|---|---|---|---|
| N-methyl-2-pyrrolidone | 50 | 40 | 40 | 35 | 30 | 30 | 30 | 40 |
| Soybean Oil | 50 | 60 | 50 | 50 | | | | |
| Dipropylene Glycol Methyl Ether Acetate | | | 10 | | | | | |
| Xylene | | | | 15 | | | | |
| Corn Oil | | | | | | 70 | | |

TABLE II-continued

| Composition | 2 | 4 | 6 | 7 | 10 | 11 | 13 | 15 |
|---|---|---|---|---|---|---|---|---|
| Peanut Oil | | | | | 70 | | | |
| Olive Oil | | | | | | 70 | | |
| Thickener (Fumed Silica) | | | | | 3 | 3 | 3 | |
| Rape Seed Oil | | | | | | | | 55 |
| d-limonene | | | | | | | | 5 |

A comparative test was conducted for paint stripping capabilities as to Rust-oleum®, a two part epoxy (Zynolyte Products Co. tub and tile finish Carson, Calif.), an oil modified urethane resin (Satin XL88 Waterlox, Cleveland, Ohio) vinyl acrylic latex (Sears) and varnish (approximately 30–40 year old varnish of unknown manufacture from a household door). Each of the above paints were applied to a sheet metal surface and allowed to cure for at least thirty six hours. Each of the compositions were applied to the paint surface with a paint brush such that the entire surface was wetted with the particular composition. The results are shown in Table III wherein the numbers indicate that the lift off time of each composition in seconds.

TABLE III

| Sample Description | Rust-oleum | Epoxy | Urethane | Sears | Varnish |
|---|---|---|---|---|---|
| A. (Table I) | 222 | 609 | 315 | 48 | 255 |
| B. (Table I) | 219 | 525 | 311 | 45 | 242 |
| C. (Table I) | 244 | 501 | 302 | 40 | 245 |
| D. (Table I) | 245 | 567 | 300 | 33 | 244 |
| E. (Table I) | 242 | 574 | 351 | 29 | 237 |
| F. (Table I) | 228 | 500 | 299 | 45 | 247 |
| G. (Table I) | 227 | 548 | 241 | 43 | 234 |
| H. (Table I) | 212 | 453 | 229 | 40 | 225 |
| I. (Table I) | 187 | 397 | 217 | 27 | 219 |
| J. (Table I) | 166 | 399 | 197 | 26 | 187 |
| K. (Table I) | 154 | 390 | 174 | 21 | 175 |
| #2 (Table II) | 306 | * | 360 | 135 | 341 |
| #4 (Table II) | 393 | * | 361 | 195 | 326 |
| #6 (Table II) | 812 | * | 494 | 187 | 259 |
| #7 (Table II) | 245 | * | 281 | 272 | 272 |
| #10 (Table II) | 430 | * | 388 | 262 | 325 |
| #11 (Table II) | 448 | * | 417 | 316 | 462 |
| #13 (Table II) | 572 | * | 410 | 252 | 328 |
| #15 (Table II) | 408 | * | 337 | 197 | 292 |

*No lift-off noted after two hours.

As demonstrated in the above table the lift off time of compositions of the present invention are far superior to those of the organic oil/NMP compositions of the prior art.

EXAMPLE II

The composition of Example II was comparatively tested for stripping characteristics versus a 99% NMP 1% methocel stripper formulation. The compositions were tested in accordance with the procedure of Example I on the same finishes. The results of the tests are set forth in Table IV wherein lift off times are set forth in seconds.

TABLE IV

| Sample Description | Rust-oleum | Epoxy | Urethane | Sears | Varnish |
|---|---|---|---|---|---|
| C-69% NMP (Ex. II) | 226 | 483 | 310 | 40 | 229 |
| NMP + 1% Methocel | 232 | * | 478 | 42 | 259 |

*No lift off noted.

As demonstrated by these results, the compositions of the present invention provide faster results for the stripping of paint as compared to NMP alone.

EXAMPLE III

A composition of the present invention is formulated by mixing 30% d-limonene obtained from Florida Chemical Company, Inc. of Lake Alfred Fla., with 69% n-methylpyrrolidone obtained from BASF and a cellulosic thickener in an amount of 1%. These components were mixed in a suitable container and applied to the following substrates.

The product was found to remove various paints as set forth above and was found to have a long shelf life, pleasant odor and is made up of biodegradable components.

While the invention has been described with reference to the preferred embodiments above, it is to be understood and appreciated that the invention is susceptible to modification, variation and change without departing from the proper scope and fair meaning of the accompanying claims.

What is claimed is:

1. A paint stripper composition having good shelf life and good odor properties, consisting essentially of:
    from about 28% to about 34% d-limonene;
    from about 65% to about 70% n-methylpyrrolidone; and
    from about 1% to about 2% of a cellulosic thickener.

2. The paint stripper of claim 1 wherein said d-limonene is a naturally derived d-limonene having a citrus aroma.

3. The paint stripper composition of claim 1, further comprising 69% N-methyl-2-pyrrolidone, 30% d-limonene and 1% cellulosic thickener, all percentages being weight percentages.

4. The paint stripper composition of claim 1, wherein the cellulosic thickener is METHOCEL®.

* * * * *

UNITED STATES PATENT AND TRADEMARK OFFICE
CERTIFICATE OF CORRECTION

PATENT NO. : 5,298,184  Page 1 of 2
DATED : March 29, 1994
INVENTOR(S) : Chester P. Jarema It is certified that error appears in the above-indentified patent and that said Letters Patent is hereby corrected as shown below:

Col. 1, Line 11, "dlimonene" should be -- d-limonene --

Col. 2, Line 13, "shelf-life" should be -- shelf life --

Col. 3, Line 1, "Unexpectantly" should be ---unexpectedly---

Col. 3, Line 25-26, "N-methyl 2 pyrrolidone" should be -- N-methyl-2-pyrrolidone --

Col. 3, Line 38, "unexpectantly should be -- unexpectedly --

Col. 3, Line 40, "d-linonene" should be -- d-limonene --

Col. 4, Line 29, "composition" should be -- compositions --

Col. 5, Line 11, "finish" should be -- finish, --

Col. 5, Line 13, "Ohio)" should be -- Ohio), --

Col. 5, Line     "thirty six" should be -- thirty-six --

UNITED STATES PATENT AND TRADEMARK OFFICE
CERTIFICATE OF CORRECTION

PATENT NO. : 5,298,184
DATED : March 29, 1994
INVENTOR(S) : Chester P. Jarema

It is certified that error appears in the above-indentified patent and that said Letters Patent is hereby corrected as shown below:

Col. 5, Line 21, delete -- that --

Col. 5, Line 21-22, "lift off" should be -- lift-off --

Col. 5, Line 44, "lift off" should be -- lift-off --

Col. 6, Line 3, "lift off" should be -- lift-off --

Col. 6, Line 12, "lift off" should be -- lift-off --

Col. 6, Line 21, "Alfred" should be -- Alfred, --

Signed and Sealed this

Twenty-third Day of August, 1994

Attest:

BRUCE LEHMAN

*Attesting Officer*     *Commissioner of Patents and Trademarks*